United States Patent [19]
Hebert et al.

[11] Patent Number: 5,605,143
[45] Date of Patent: Feb. 25, 1997

[54] METHOD AND PRODUCT FOR CLEANING COOKING GRILLS

[76] Inventors: Paul R. Hebert, 321 S. Elm St., Wallingford, Conn. 06492; John R. Busca, 230 Brooksvale Ave., Hamden, Conn. 06514

[21] Appl. No.: 509,550

[22] Filed: Jul. 31, 1995

[51] Int. Cl.$^6$ .................................................. F24C 3/00
[52] U.S. Cl. .............................. 126/41 R; 99/450; 99/426
[58] Field of Search .................... 99/450, 426; 126/41 R

[56]  References Cited

U.S. PATENT DOCUMENTS

| | | | |
|---|---|---|---|
| 913,148 | 2/1909 | McNulty | 126/41 R |
| 3,722,402 | 3/1973 | Plumley | 99/450 |
| 4,510,855 | 4/1985 | Avner | 99/450 |
| 4,878,477 | 11/1989 | McLane | 126/41 R |
| 5,399,439 | 3/1995 | Rasmussen | 99/450 |
| 5,447,097 | 9/1995 | Rhee | 99/450 |

Primary Examiner—Carroll B. Dority
Attorney, Agent, or Firm—Richard T. Holzmann

[57] ABSTRACT

A device for cleaning barbecue gratings comprises a heat reflective perforated plate for placement on the barbecue grating and a removable handle for use in conjunction with said plate for placement and removal thereof. The material of construction of said plate is selected from the group consisting of highly polishable stainless steels, chromium-plated steels, steels coated with heat-resistant reflective materials and aluminum. Both sides may be polished allowing said plate to be reversed in use extending the useful life thereby. The device having sufficient slots and holes therein located to facilitate removal of gas and excess heat. Another lower cost embodiment comprises a hinged, two-piece wire or angled metal frame which allows heat-reflective aluminum foil to be suspended tautly within said frame to maintain foil flatness and to evenly distribute heat. A method for cleaning soiled barbecue gratings by placing said highly polished heat-reflective perforated plate on the grating, turning-up the heat of the grill for about 10 minutes, and then brushing away the residual ash remaining from burnt food soils.

6 Claims, 4 Drawing Sheets

METHOD AND PRODUCT FOR CLEANING COOKING GRILLS

FIELD OF THE INVENTION

The present invention relates in general to a method of cleaning cooking grills, and more particularly to a device and method using a heat reflective metal plate to clean the grating.

BACKGROUND OF THE INVENTION

In the conventional outdoor barbecue grill, food juices and liquid fats drip into the fire below causing flare-ups which often not only burn the food, but also normally leave difficult to remove residues on the grating itself. Typically, the grating of a barbecue cooker has not been thoroughly cleaned, if cleaned at all, from previous use and an unhealthy appearance and condition continues into subsequent use. Furthermore, unwanted odors arise from the heating of previous barbecue residues as well as from starter fluids. Cleaning, if done at all, frequently waits until the next day or later, increasing the effort required to remove the food and grease residues.

To overcome these problems, most attention has been directed in the past to minimizing, on the one hand, the contact of these juices and fats within the grill, and to a lesser extent on the other, with cleaning the grating itself. A number of conventional reusable and disposable products have been used for broiling foods in ovens, over permanent gratings, and in barbecuing cookers to collect food juices and liquid fats keeping them from reaching the heating source and surrounding structure, and collecting them for convenient removal and disposal.

Hungerford in U.S. Pat. No. 5,009,151 discloses a cooking protective food support that includes a plurality of raised portions (crests) and a plurality of lower portions (troughs), a second side being substantially an inverted image of the first side, which supports food to be cooked and collects cooking food juices. Thereafter, this scraped and brushed side becomes the bottom side or underside during the next barbecuing period time, and the heat created from the heating source serves to burn away the food residues and further clean and sterilize this underside. Light gauge aluminum or steel is formed directly into this barbecuing protective food support and this becomes a throw-away or disposable product after a few uses. More expensive, are those with a non-stick coating or those coated with porcelain, which evenso need to be disposed off after a number of uses. Other embodiments using thicker materials, not considered to be throw-aways, are molded or cast thereby adding considerably to their cost.

In another conventional device disclosed by Levin in U.S. Pat. No. 4,969,449, a disposable grill consists of a corrugated and perforated sheet of heavy duty aluminum foil, between 0.5–4.0 mils thick. The first set of holes in the corrugations allow smoke to access the bottom surface of the food being cooked so that the desired barbecue flavor is obtained. A second set of holes formed in the bottom of the troughs for fat drippings do not allow the drippings to come in contact with the wire grating. Nemetz in U.S. Pat. No. 3,555,994 describes a disposable foil cover for a grill of a barbecue to specifically protect the wire grating from being covered with grease drippings. However, this cover is only applicable for wire gratings having spacings perfectly aligned with the disposable foil cover.

Lucky in U.S. Pat. No. 4,637,303 discloses a cooking rack for use on a cooking surface in a vehicle or vessel which is bounced about causing pots and pans placed on a stove top or oven to tip over. The cooking rack has a plurality of perforations therein for receiving a plurality of securing pins. The cooking utensils are placed on or under the rack and the securing pins are placed in the perforations around the cooking utensils to hold the utensils in place. In an oven, the securing pins also extend through the conventional oven rack to engage the conventional rack and prevent the cooking rack from moving relative to the oven. The preferred embodiment of this invention comprises plate means and pin means made from stainless steel having a thickness sufficient to prevent flexing and warpage when subjected to a load.

One additional patent, issued to Sachnoff and Levin, U.S. Pat. No. 3,211,082, discloses a liner for oven racks adapted to be positioned on the wire rack of an oven for the purpose of protecting the wire rack from grease and other drippings which are normally deposited on the rack. This disposable liner, preferably made of 4.0 mil aluminum foil, has good heat reflecting surfaces and has troughs therein for retaining drippings as well as spaced openings permitting heat to circulate through the liner in the oven.

As can be seen, most of these prior art devices were designed to prevent drippings from coming into contact with a wire grating in the first place rather than cleaning them after the grating has become soiled. Furthermore, they are usually of the disposable type of corrugated foil having a short lifetime, or, if coated they become considerably more expensive and are still not suitable for continued, extensive use. If thickened to allow long-term use, molding or casting is required adding to their cost.

None of these techniques are really directed exclusively to the problem of cleaning heavily soiled barbecue gratings, for example, which conventionally are scraped or wire-brushed thereby damaging the surface and shortening its life. Another technique is to clean by brushing with chemical cleaners which is messy, hazardous and expensive. Others allow the residues to burn off incompletely with continued contact with the hot flame for extended periods of time dissipating much energy in the process and still requiring vigorous brushing. Many conventional gratings have Teflon®-like coatings thereon which abrade off when in touch with a wire brush. Some grill systems have automatic timers which turn-off the heat after a set time.

SUMMARY OF THE INVENTION

In view of the foregoing, it is, therefore, an object of the present invention to provide a method and device for cleaning soiled cooking gratings, the frame of metal bars used for holding the food to be grilled, in which the aforementioned problems can be overcome, that is relatively simple and inexpensive to use and manufacture as well as being long lived, but still cleans virtually everything off the grating without requiring the vigorous abrasive action of scraping or wire-brushing.

Another object of the present invention is to provide a method and device for cleaning soiled cooking wire gratings that is capable of easily accommodating itself to the various types and sizes of grills existing in the marketplace.

A further object of the invention is to significantly reduce the thermal energy required to achieve complete cleaning from that necessary in conventional methods.

In a primary embodiment, a perforated reflective plate is disclosed for placement on a cooking grill for cleaning the grating. This plate is placed on the grating after cooking is complete. The device has sufficient slots and holes as perforations therein located to facilitate removal of gases resulting from the combustion of the soil deposited on the grating as well as for removal of excess heat. The polished reflective side is placed downward and is left on the grating for approximately 10 minutes while the heat is maintained at a high level. The heat is turned off and the system is allowed to cool whereupon the reflective plate is removed and the soil has been burnt to a white powder allowing easy, non-abrasive cleaning with the gentle action of a conventional grating brush.

In other embodiments the material of construction of said plate is selected from the group consisting of highly polishable stainless steels, chromium-plated steels, steels coated with heat-resistant reflective materials and aluminum. Also the highly polishable materials of construction of said plate may be polished on both sides allowing said plate to be reversed in use extending the useful life thereby.

A further embodiment comprises a hinged, two-piece frame which allows heat-reflective aluminum foil to be suspended tautly within said frame to maintain foil flatness and to evenly distribute heat; and a removable handle for use in conjunction with said frame for placement and removal thereof.

Finally, a method for cleaning soiled barbecue gratings comprises the steps of: placing a handle into a handle receiver slot of a highly polished heat-reflective perforated plate having a thickness sufficient to resist flexing and warpage during the elevated heat levels necessary to clean the grating by reducing food soils to ash for placement on the barbecue grating; placing said plate with a heat-reflective surface down on the barbecue grating; closing the lid of the grill to conserve energy; turning-up the heat of the grill for about 10 minutes; turning-off the heat; allowing said plate to cool; removing said plate from the grill; and brushing away the residual ash remaining from burnt food soils.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
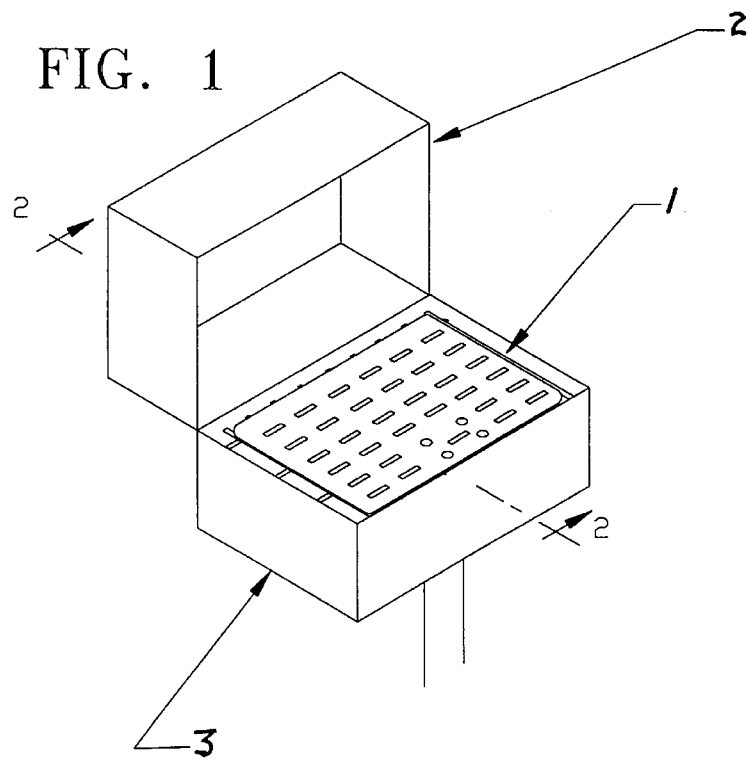
FIG. 1 is a perspective view of an outdoor barbecue grill with a rectangular heat reflective plate structure in place according to a primary embodiment of the present invention.

With reference to FIG. 1, there is shown a perspective view of a grill, grill body 3 and grill lid 2, and a rectangular heat reflective plate 1 in place in a first embodiment of the invention which plate 1 in its best mode is manufactured from stainless steel of a grade (main types 304, 309 and 310) that is resistant to the elevated heat levels necessary to decompose the food soils on the grating 4 and reduce it to ash. A 304 stainless; steel of 18 gauge with a #4 polish is very suitable. Plate 1 must be able to be polished to a high shine in order to enhance its reflectivity and thereby minimize heat loss. All edges of the plate 1 should be burr-free and blunted for safe handling. Furthermore, the polished surface must remain free of scratches for optimum performance.

The plate 1 is of a flat construction of approximately 0.080" thickness evenly slotted with approximately 1" by 0.25" slots 9. Spacing between slots 9 should be about 1.0" minimum. For optimum performance, slots 9 should fall in-between grating 4 bars to facilitate gas escape and reduce the risk of over heating. The thickness of plate 1 is determined by the material of construction and the method of manufacture so long as it is thick enough to resist flexing and warpage.

Figure 2:
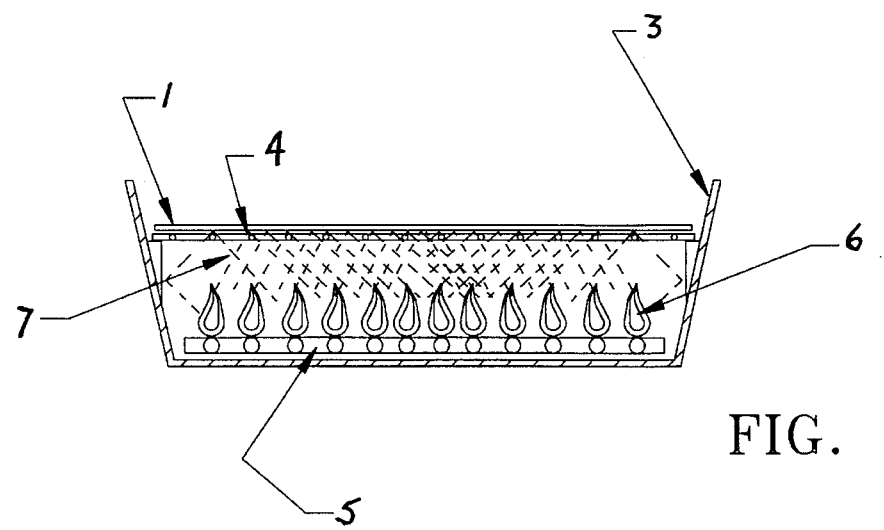
FIG. 2 is a cut view of FIG. 1.
Figure 4:
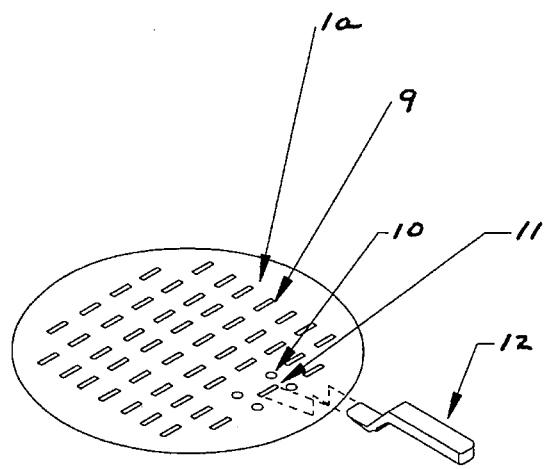
FIG. 4 is a perspective view of a round heat reflective plate structure showing how the handle operates.
Figure 5:
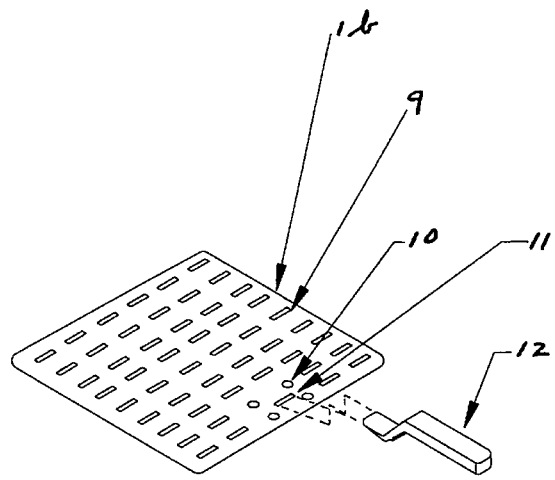
FIG. 5 is a perspective view of a square heat reflective plate structure with a handle.

These plates are to be cut in rectangular 1, circular 1a and square 1b shapes to fit the various grill sizes on the market as shown in FIGS. 1, 4 and 5. About ½" clearance around the edge of the plate and the inside of the grill walls should be allowed for easy placement and ready exhaustion of gases (see FIGS. 1 and 2). The exact dimensions are not critical; the sizes having been chosen to accomodate a variety of commercial grills.

Commercial grills today are gas grills, liquid-petroleum grills, electric grills and charcoal grills. While the heat-reflective plate of this invention will work with all types of grills, it is best suited to those, such as the gas grill, that use either natural gas or bottled propane, which are most suited to instant response and control.

Figure 3:
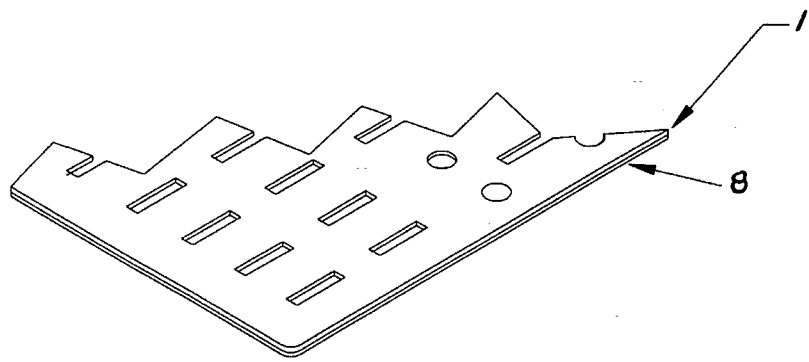
FIG. 3 is a cut perspective detailed view of a coated plate according to a second embodiment of the present invention.

In a second embodiment of the invention as shown in FIG. 3, the steel 1 capable of a high polish can be coated with either a clear heat resistant protective finish 8 or a reflective, heat resistant composite material 8 so long as such coatings are non-corrosive, or indeed less expensive chromium-plated steel may be employed in order to reduce the possibility of scratching the metal surface and maximizing the lifetime of the product.

A Z-shaped handle 12 for lifting and placing or removing the plate 1 from the grill is shown in FIG. 4. This removable handle 12 is preferably an aluminum extrusion, however, a stamping or casting would work as well; cost is the major consideration.

Aluminum polished to a high shine with a minimum thickness of 0.0125", to minimize plate warpage, is utilized in a third embodiment of the invention. While less expensive than the stainless steel, it is also inferior in performance in that it does not heat evenly and does not lend itself to multiple reuses.

In a fourth embodiment of the present invention both sides of the heat reflective plate are highly polished thereby allowing the plate to be reversed in use extending the useful life considerably.

Figure 6:
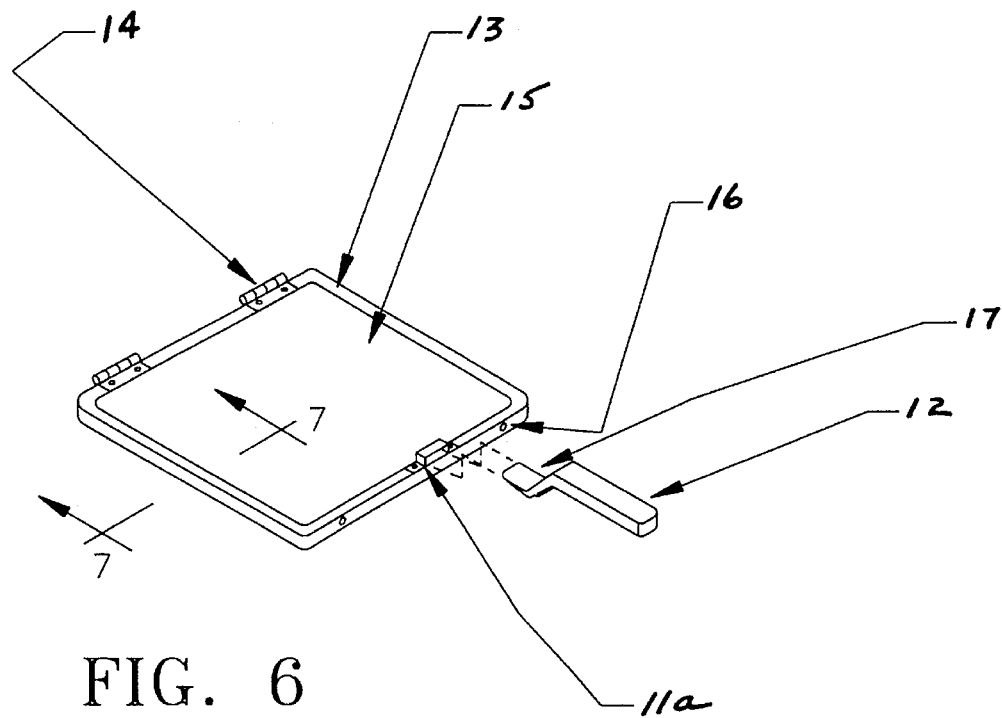
FIG. 6 is a perspective view of a frame with aluminum foil as the reflective metal according to another embodiment of the present invention.
Figure 7:
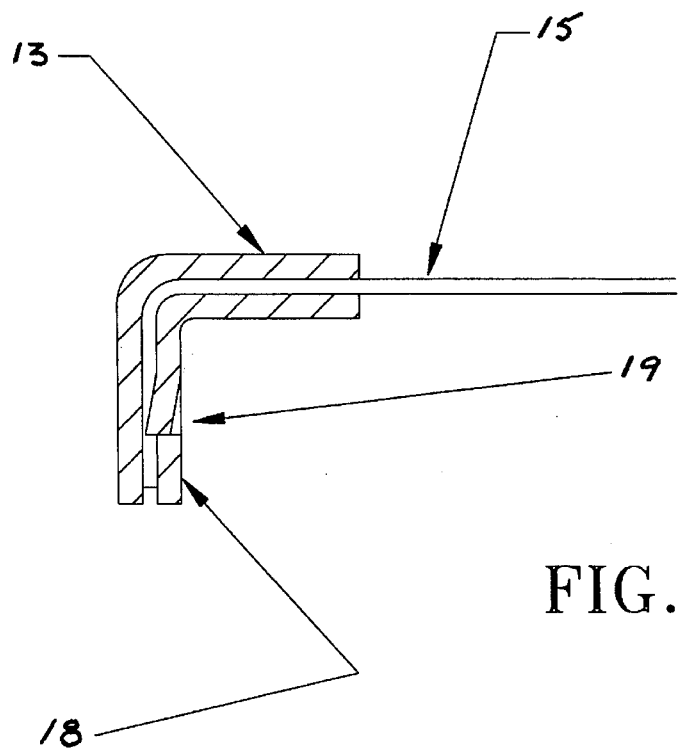
FIG. 7 is a cut view of FIG. 6.

In an effort to reduce costs, a fifth embodiment of the present invention is shown in FIGS. 6 and 7 wherein a hinged 14, two-piece, 13 and 18, wire frame was fabricated which allows aluminum foil 15 to be suspended tautly within the frame made of heat- and corrosion-resistant heavy wire or angled metal 13, 18 to maintain sheet flatness and to evenly distribute heat. Hinges 14 can be of the standard piano hinge type. However, while useful, this configuration resulted in the foil 15 rising from the grating 4 giving uneven heating and, of course, the foil 15 is non-reusable.

Figure 8:
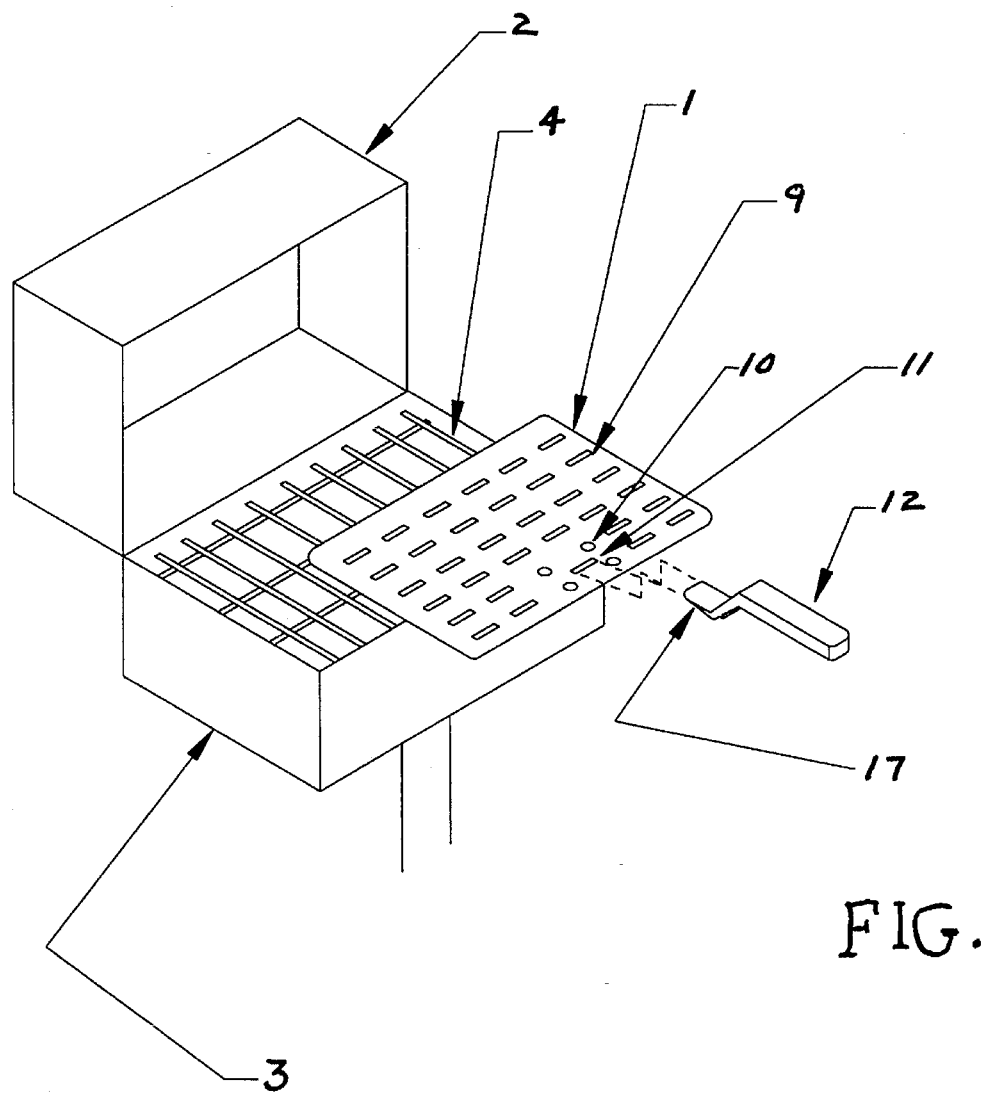
FIG. 8 is an exploded view of the operation of the method of use of FIG. 1 with a handle.

In the method of this reflective plate cooking grill self-cleaner as shown in FIG. 8, the reflective side of plate 1 is placed on grating 4 by means of handle 12, lid 2 of the grill system is closed to conserve energy and gas burners 5 are turned up for a period of about 10 minutes. The heat is then turned-off and the system is allowed to cool. Plate 1 is then removed and the white ash residue remaining from the burnt soil is gently brushed off the grating 4.

Other reference numerals used in the drawings are as follows: 6 represents the gas flame while 7 represents radiating heat; 10 are heat/gas exit holes; 11 is a handle receiver slot and 11a is a handle receiver fixture; 16 are interlocking dimples for a press fit of the frames; 17 is the flange of the handle; and 19 are gripper lips to retain the foil in the frames.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A device for cleaning barbecue gratings comprising:

a cooking grill having a barbecue grating therein;

a highly polished heat reflective perforated plate having holes therein, evenly slotted with approximately 1 inch by 0.25 inch slots said slots spaced about 1 inch minimum apart, having a thickness sufficient to resist flexing and warpage during the elevated heat levels necessary to clean the grating by reducing food soils to ash, for placement on the barbecue grating; and a removable handle for insertion in a handle receiver as part of said plate for use in conjunction with said plate for placement and removal thereof.

2. The device according to claim 1 wherein the material of construction of said plate is selected from the group consisting of highly polishable stainless steels, chromium-plated steels, steels coated with heat-resistant reflective materials and aluminum.

3. The device according to claim 2 wherein the highly polishable materials of construction of said plate are polished on both sides allowing said plate to be reversed in use extending the useful life thereby.

4. The device according to claim 1 having sufficient slots and holes as perforations therein located to facilitate removal of gas and excess heat.

5. A device for cleaning barbecue gratings comprising:

a hinged, two-piece frame which allows heat-reflective aluminum foil to be suspended tautly within said frame to maintain foil flatness and to evenly distribute heat characterized by having standard piano hinges in close proximity joining said two pieces allowing the one piece of said frame to be raised and lowered, said two pieces having interlocking dimples for a press fit of said frame and the other piece having gripper lips to retain the foil in said frame, material for said frame selected from the group consisting of heat- and corrosion-resistant heavy wire and angled metal; and a removable handle, for insertion in a handle receiver fixture attached to the one piece of said frame for placement and removal thereof.

6. A method for cleaning soiled barbecue gratings comprising the steps of:

placing a handle into a handle receiver slot of a highly polished heat-reflective perforated plate having holes therein, evenly slotted with approximately 1 inch by 0.25 inch slots said slots spaced about 1 inch minimum apart, having a thickness sufficient to resist flexing and warpage during the elevated heat levels necessary to clean the barbecue grating by reducing food soils to ash, for placement on a cooking grill having the barbecue grating therein;

placing said plate with a heat-reflective surface down onto the barbecue grating;

closing the lid of the grill to conserve energy;

turning-up the heat of the grill for about 10 minutes;

turning-off the heat;

allowing said plate to cool;

removing said plate from the grating; and brushing away the residual ash remaining from burnt food soils on the grating with a gentle brushing action.

* * * * *